United States Patent
Coleman

(10) Patent No.: US 8,597,525 B1
(45) Date of Patent: Dec. 3, 2013

(54) SYSTEM INCLUDING A FORCED AIR GAS-FIRED FLUIDIZED BED COMBUSTION CHAMBER FOR PURIFYING AND RECIRCULATING POTABLE WATER AS WELL AS FOR GENERATING ELECTRICITY

(76) Inventor: William E. Coleman, Boulder, CO (US)

( * ) Notice: Subject to any disclaimer, the term of this patent is extended or adjusted under 35 U.S.C. 154(b) by 19 days.

(21) Appl. No.: 13/099,618

(22) Filed: May 3, 2011

Related U.S. Application Data

(63) Continuation-in-part of application No. 13/071,069, filed on Mar. 24, 2011, which is a continuation-in-part of application No. 12/775,142, filed on May 6, 2010.

(51) Int. Cl.
*C02F 1/78* (2006.01)
*C02F 1/16* (2006.01)

(52) U.S. Cl.
USPC ........... 210/760; 210/764; 110/220; 110/234; 110/244; 110/342; 110/346; 203/22; 203/27; 48/197 A

(58) Field of Classification Search
USPC ................. 110/219, 220, 224, 233, 234, 244, 110/341–348; 210/758, 760, 764, 766, 175; 422/139, 239; 203/21–27; 48/197 A
See application file for complete search history.

(56) References Cited

U.S. PATENT DOCUMENTS

| | | | |
|---|---|---|---|
| 3,859,174 A * | 1/1975 | Taylor | 110/346 |
| 3,910,775 A | 10/1975 | Jackman | |
| 3,996,862 A * | 12/1976 | Besik et al. | 110/234 |
| 4,568,463 A | 2/1986 | Klein | |
| 4,812,237 A | 3/1989 | Cawley | |
| 4,983,296 A | 1/1991 | McMahon | |
| 5,205,906 A * | 4/1993 | Grutsch et al. | 203/21 |
| 6,383,369 B2 | 5/2002 | Elston | |
| 6,490,866 B1 | 12/2002 | Cummings | |
| 6,688,048 B2 | 2/2004 | Staschik | |
| 7,566,351 B2 | 7/2009 | Leveson | |
| 2004/0262206 A1 | 12/2004 | Gettman | |
| 2006/0091083 A1* | 5/2006 | Lumbert | 210/760 |
| 2007/0266916 A1* | 11/2007 | Copeland et al. | 110/224 |
| 2011/0023485 A1* | 2/2011 | Schubert | 60/657 |

FOREIGN PATENT DOCUMENTS

| | | |
|---|---|---|
| CN | 101358153 | 2/2009 |
| CN | 201276728 | 7/2009 |

OTHER PUBLICATIONS

"Clean-Burning Coal-fired electric Plant Adopts High-Performance Dust Suppression", Dust Boss.com http://www.dustboss.com/_data/files/showcase/jobstories/coal/AES%20 /020Hawaii.pdf, 2008.
"Solids Handling for Water & Wastewater Treatment," Tech Review, 2006 Global Energy Partner, LLC http://www.nyserda.org/Programs/Environment/SolidsHandlingTechReview.pdf, 2006.
Sandra Upson, "Wizards of the water cycle," IEEE Spectrum, Jun. 2010, pp. 56-61.

\* cited by examiner

*Primary Examiner* — Lucas Stelling
(74) *Attorney, Agent, or Firm* — Duft Bornsen & Fettig, LLP

(57) ABSTRACT

Water purification and recycling system having a large reservoir and a small reservoir adapted to provide potable water to a water user structure. After use by the water user structure, wastewater is applied from said water user structure via at least one wastewater path to wastewater treatment apparatus. The wastewater treatment apparatus receives and processes the wastewater using a coal free power plant that operates continuously to produce steam. The wastewater treatment apparatus is also powered by a co-adjuvant gas turbine generator is adapted to generate supplemental steam for the coal free power plant.

7 Claims, 7 Drawing Sheets

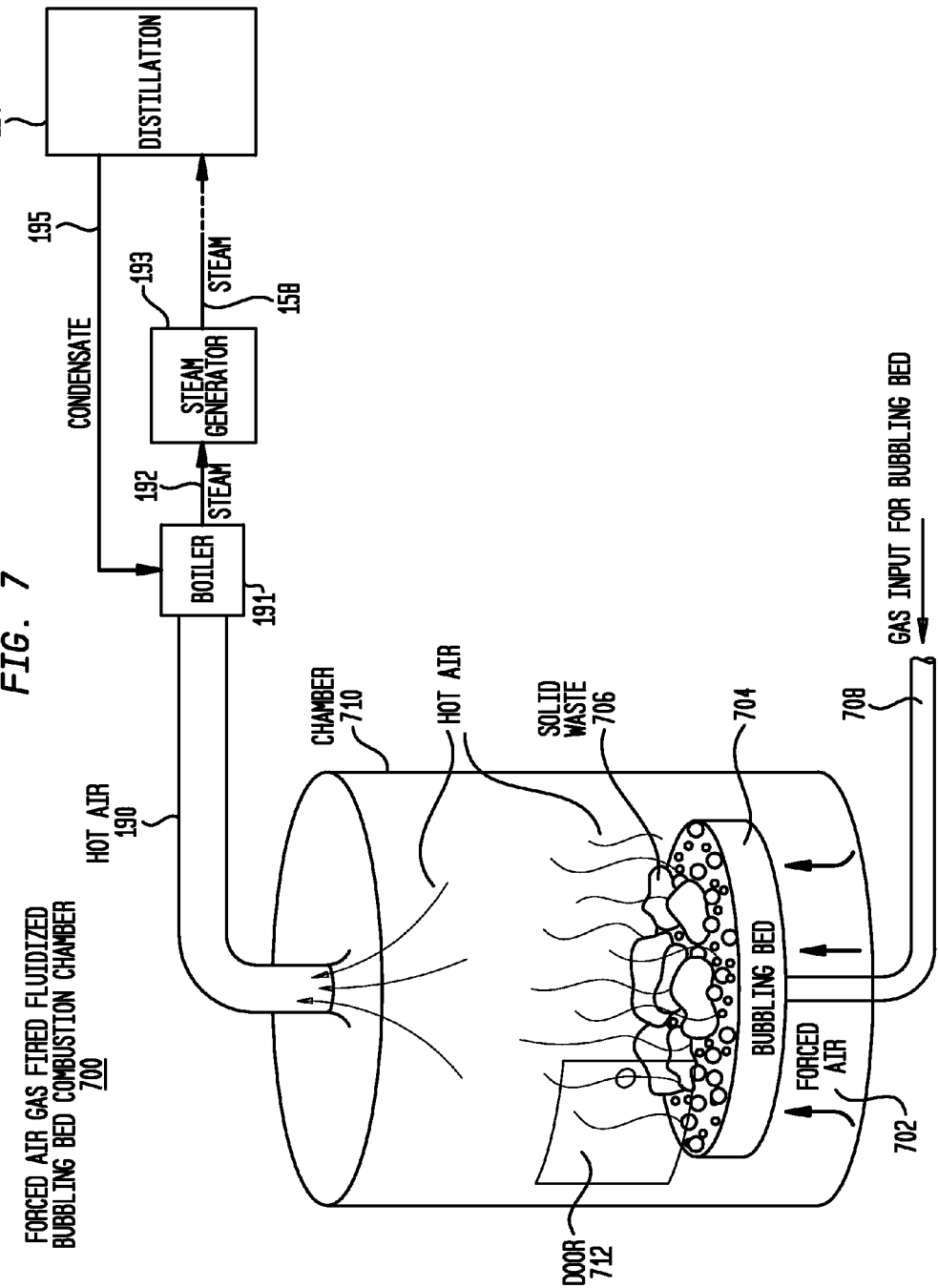

SYSTEM INCLUDING A FORCED AIR GAS-FIRED FLUIDIZED BED COMBUSTION CHAMBER FOR PURIFYING AND RECIRCULATING POTABLE WATER AS WELL AS FOR GENERATING ELECTRICITY

RELATED APPLICATIONS

The patent application is a continuation in part of a co-pending U.S. non-provisional patent application Ser. No. 12/775,142 filed 6 May 2010 and identically entitled, and also a continuation in part of co-pending U.S. non-provisional patent application Ser. No. 13/071,069 filed 24 Mar. 2011, both of which are hereby incorporated by reference.

FIELD OF THE INVENTION

This invention relates to a wastewater treatment system that processes wastewater and recirculates potable water from a water source to a water user, and generates electricity.

This invention further relates to a wastewater treatment system having co-adjuvant power sources that process wastewater and re-circulates potable water from a water source to a water user, and generates electricity.

This invention still further relates to a wastewater treatment system having a gas-fired co-adjuvant generator and a forced air gas-fired fluidized bed combustion chamber that processes wastewater and re-circulates potable water from a water source to a water user and generates electricity.

BACKGROUND OF THE INVENTION

Many cities and municipalities face increasing problems of obtaining potable water adequate for their needs. In the arid southwest portions of the United States, land is often not used because of a lack of water. Disputes can arise when a limited amount of water is shared by cities and agricultural areas. Some cities often limit their watering of lawns, golf courses, etc. A contributing factor to the worsening water shortage is that cities do little or nothing to improve the way their waste water is processed after use by the consumer.

Typically, this waste water is sent to a sewage processing facility where it is treated and discharged into a river or the like where it flows downstream for other users.

STATEMENT OF THE PROBLEM

State-of-the-art wastewater processing facilities are not always inexpensive. But, costs can be a major factor. There are a number of costs that must be considered when designing the type of wastewater system to be acquired.

Facilities designed and operated to produce electric power are diverse and use a variety of fuels such as coal, natural gas, diesel fuel, crude oil, and assorted bio-mass sources. The steam generating process begins with the combustion of fuel creating heat which converts water to steam which flows through a steam turbine generator. The byproduct from the generator is "waste steam" which is the energy source used for the purification and recirculation process of the invention.

It should be realized that some steam power plants (coal) have a dormant/active transition (off/on) time of approximately 48 hours. Therefore, they are not well-suited for applications having large power output deviations. Coal-fired power plants may be operated at a relatively low cost because coal is relatively low cost and is well suited to the generation of steam power at a relatively constant output. However, coal cannot be used in applications where the demand varies, such as night/day operations.

The political tide has recently shifted against the use of coal because of its emission problems. It is probable that the use of coal will be banned for use in some populated areas.

SOLUTION

The present invention solves the above problems with respect to the provision of a suitable electrical power for use with the wastewater apparatus suitable for circulating and purifying water of a housing development. Specifically, in accordance with the present invention, power is provided for the use of wastewater apparatus by the use of a first gas-fired facility and a second gas-fired facility. The second gas-fired facility comprises a forced air gas-fired fluidized bubbling bed combustion chamber. The second gas-fired facility is designed to run continuously 24/7. The first gas-fired facility is used only intermittently when the steam required by the wastewater facility cannot be obtained from the second power facility.

The demand for wastewater processing facilities is not linear and includes time-wise variations and use of these facilities is at its peak during daylight hours (when users generate more sewage) and is lower during evening hours (when users generate less sewage). This creates an uneven time-wise demand for the level of service provided by wastewater apparatus embodying the invention. The coal free power plant is well suited to the generation of steam power at a relatively constant output.

In some locations forced air gas-fired combustion chamber may be used having a circulating fluidized bed or bubbling bed design. Bed materials could be such things as ceramic pellets, sand or gravel. Construction costs would be similar to a coal-fired power plant. Operating costs would be higher because of the fuel cost. However, the operating flexibility would be greatly enhanced and would provide economic value.

The disclosed system includes a forced air gas-fired fluidized bed combustion chamber for purifying and recirculation potable water as well as for generating electricity.

The coal free power plant disclosed herein is operated continuously 24/7 to provide a steady low level of steam. This coal free power plant operates continuously to provide the steam needed during the late-night hours. It also generates this low level of steam during the remainder of a 24 hour period for use during daylight hours. To assure an efficient and continuous operation, the use of supplemental fuels will be necessary either continuously or from time to time. Materials which could be considered for use as supplemental fuels could be things such as woodchips, dried mulch, municipal trash, etc.

The co-adjuvant gas turbine generator may be dormant when the coal free power plant provides sufficient steam during low wastewater usage in the nighttime hours. The co-adjuvant gas turbine generator remains dormant until its output steam is needed to supplement steam from the coal free power plant. The co-adjuvant gas turbine generator is controllably switched from an off to an on state to generate the supplemental steam needed during busier daytime hours. The co-adjuvant gas turbine generator continues to operate as long as its supplemental steam is needed. The present embodiment of the invention provides the combined use of a coal free power plant and a co-adjuvant gas turbine generator for provision of the supplemental steam required for purification and processing of wastewater into potable water.

The apparatus and methods embodied by this invention are economical, efficient, and effective because:

1. The amount of water required for cooking and drinking is small relative to the total water requirements of a water user structure.
2. The amount of wastewater leaving the water user structure that contains solids and bacteria is small compared to the total wastewater leaving the water user structure.
3. The coal free power plant together with the co-adjuvant gas turbine generator provides the steam required to operate the wastewater processing system. The coal free power plant generates steam continuously operating at a defined output level commensurate with the needs of water users during low usage night time hours. The co-adjuvant gas turbine generator is activated to generate for this steam during the daytime hours when the wastewater processing needs of the users increase.
4. The coal free power plant uses activated carbon filters as supplemental fuel for the power plant.
5. The coal free power plant is adapted to generate ozone.
6. As priorly mentioned, the apparatus embodying the present invention is adapted to generate electricity. This electricity may be used by the system itself or may include facilities for generating electricity that may be sold to others. For example, the generated electricity may be sold to utilities. This would enable utilities to establish an operating presence in the areas proximate to the areas of the present system. The generating facilities of the present system may be sold to large factories and the like having a need for significant amounts of electricity. The electricity generating apparatus of the present invention includes a steam generator powered by the coal free power plant. The steam generation facilities of the present invention include the aforementioned coal free power plant and the co-adjuvant gas turbine generator of the present invention.
7. To satisfy users having a dislike for the use of coal, as fuel, the present invention is adapted to avoid the need for coal as fuel by using forced air gas-fired fluidized bed combustion chamber powered by natural gas and/or residential propane.

ASPECTS

One aspect of the invention comprises apparatus adapted to recycle water received from a water source extended to a water user structure, said apparatus comprises: a first water supply path adapted to extend potable water from a small reservoir to said water user structure, a first wastewater path for conveying greywater from said water user structure to a wastewater treatment apparatus, a second water supply path adapted to extend water from a large reservoir to said water user structure, a second wastewater path to extend blackwater comprising a mixture of solid waste and liquid waste from said water user structure to said wastewater treatment apparatus, said wastewater treatment apparatus being effective to treat said received blackwater and extend said treated blackwater as potable water to said large reservoir, wastewater treatment apparatus is powered by steam from a coal free power plant operating at a defined steam power output level as well as by steam from a co-adjuvant gas turbine generator to supplement the steam provided by the coal free power plant.

Preferably, said wastewater treatment apparatus comprises a centrifuge adapted to receive said blackwater from the second wastewater path. All centrifuges used in the present embodiment are adapted to run continuously when the system is in use and further all such centrifuges are adapted to receive Blackwater waste material at its input for processing by the centrifuge. The centrifuge separates the solid and liquid blackwater, the separated solid blackwater is applied to a dryer which dries the solid blackwater and conveys dried solid blackwater waste to a supply of coal free material to be burned as fuel by the coal free power plant, said co-adjuvant gas turbine generator is adapted to provide supplemental steam to said wastewater treatment apparatus.

Preferably, liquid blackwater separated by said centrifuge is applied to wastewater treatment apparatus which processes said separated liquid blackwater and extends it to wastewater processing apparatus for processing and extension to the large reservoir.

A second aspect comprises a method for recycling water received from a water source and extended to a water user structure, said method comprises the process steps of: extending potable water via a first water supply path from a small reservoir to a water user structure, applying greywater via a first wastewater path from said waste user structure to a wastewater treatment apparatus, extending water from a large reservoir via a second water supply path to said water user structure, conveying blackwater via a second wastewater path from said water user structure to said wastewater treatment apparatus, and processing greywater by said wastewater treatment apparatus for extension to the small reservoir, said wastewater treatment apparatus is steam powered by steam from a coal free power plant operating continuously 24/7 at a defined power output level and by steam from a co-adjuvant gas turbine generator, said co-adjuvant gas turbine generator is adapted to operate to provide supplemental steam to said wastewater treatment apparatus in addition to a low level of steam provided to said wastewater treatment apparatus by said coal free power plant.

Another aspect of the invention comprises an enclosed heating chamber having an input for receiving natural gas, a bubbling bed that receives the natural gas within the heating chamber and that is perforated and supports woodchips and the like on the top of the perforated bubbling bed which lets the received gas pass through and burn to generate heat within a chamber. The heat passes through an output of the chamber which is extended to a boiler which generates steam which passed to a turbine driven generator and becomes waste steam.

DESCRIPTION OF THE DRAWINGS

The above and other aspects of the invention may be better understood from a reading of the following description thereof taken in conjunction with the drawings wherein:

FIG. 5 also discloses a flow diagram illustrating the method of process steps provided by a co-adjuvant gas turbine generator to supply supplemental steam to the wastewater processing apparatus of FIG. 2.

FIG. 7 discloses an element entitled "Forced Air Gas Fired Fluidized Bubbling Bed Combustion Chamber" as is subsequently described in detail. The structure of FIG. 7 comprises chamber 710 and its associated elements. These elements of FIG. 7 comprise a heat generator for a coal-free power plant.

DESCRIPTION OF THE EMBODIMENTS

The figures and the following description illustrate specific exemplary embodiments of the invention. It will be appreciated that those skilled in the art will be able to devise various arrangements that, although not explicitly described or shown herein to embody the principles of the invention and are included within the scope of the invention. Furthermore, any examples described herein are intended to aid in understanding the principles of the invention, and are to be construed as being without limitation to such examples. As a result, the invention is not limited to the specific embodiments or examples described below, but only by the appended claims and their equivalents.

The terms blackwater and greywater as used in this document and shall be understood to be defined and characterized as follows. Blackwater shall be understood to characterize sewage containing human waste and/or solid particles such as waste from kitchen disposals. Greywater shall be understood to characterize wastewater generated from activities such as laundry, dishwashing, showers, and bathing.

Figure 1:
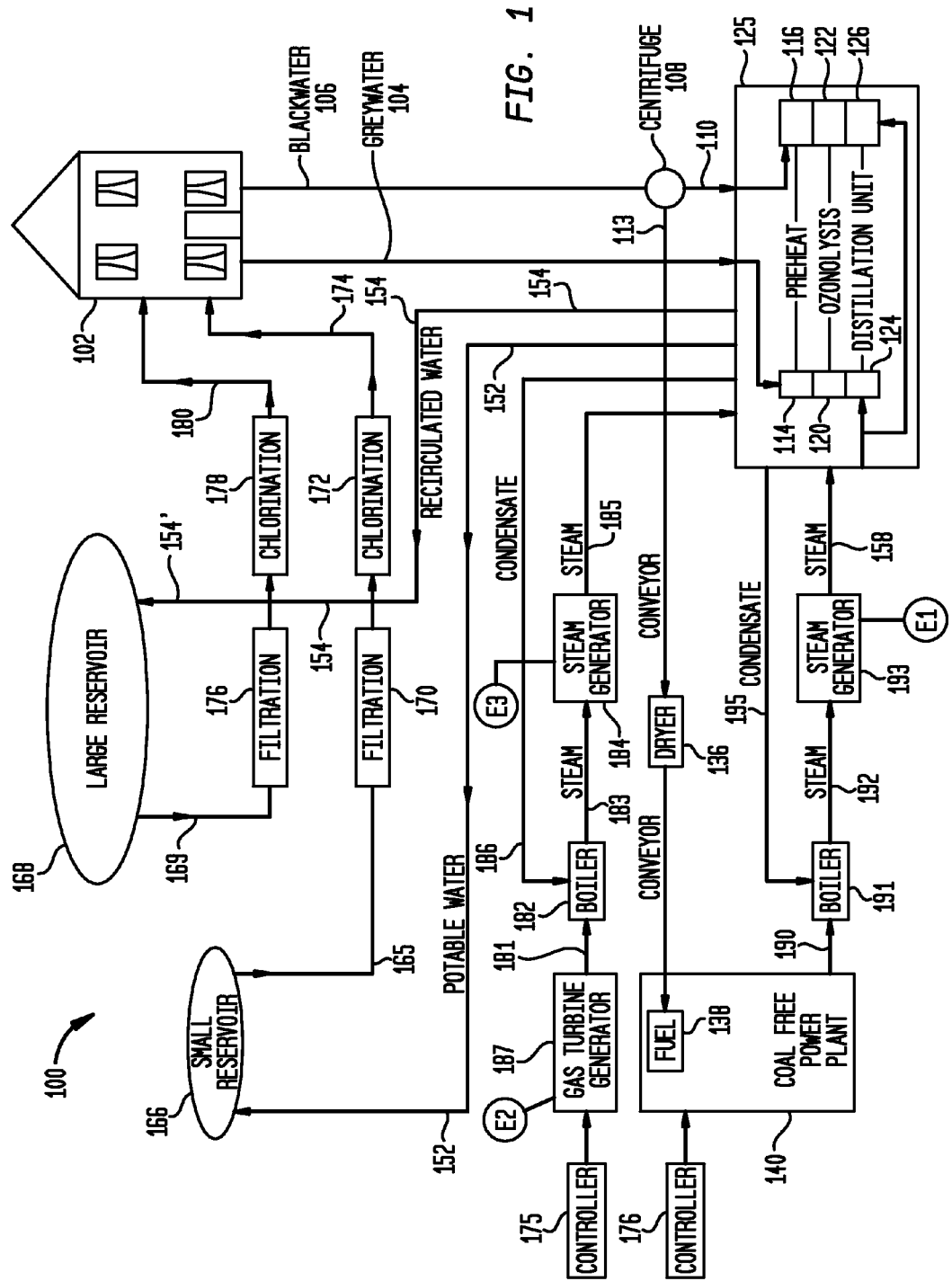
FIG. 1 discloses a block diagram description of an embodiment of the invention.

Description of FIG. 1

An embodiment of the invention includes water storage facilities comprising a small reservoir 166, a large reservoir 168, a treatment apparatus 125, and a coal free power plant 140 together with a co-adjuvant gas turbine generator 187. The output of the bubbling bed fire 704 is outputted hot air on path at 190 which extends the hot air to boiler 191. Boiler 191 converts the hot air to steam which is applied to path to steam generator 193. The output of steam generator 193 is applied via a path 194 as steam to the distilization elements. This is described in detail in the subsequent paragraphs.

Bubbling bed 704 received gas from path 708 at the bottom of chamber 710. Bubbling bed is porous to the received gas which is upwardly applied gather with to the solids 706 on the top of the bubbling bed 704 to burn and create a hot air which is extended to boiler 191 as priorly described. Chamber 710 also includes a door 712 to allow access to chamber 710.

The received gas input 708 passes upward to the top surface of bubbling bed 704 and burns to generate fire in the chamber. The top surface of bubbling bed 704 may also contain solids which are manually forced into an opening (not shown) to combine with the gas input and burn and create further hot air. Water is applied by path 165 from small reservoir 166 via filter 170, chlorination element 172, and path 174 to water user structure 102. This water is potable and is extended only to kitchen sinks, wet bars, etc. of water user structure 102 which supply potable water suitable for drinking and cooking for human consumption. Water user structure 102 is portrayed as a house. However, it may be a mixture of water user structures, such as houses, stores, apartment buildings or a mixture thereof.

Water from large reservoir 168 is extended via path 169, filter 176, chlorination element 178, and path 180 to water user structure 102. This water is provided to showers, garbage disposals, bathrooms, toilets, etc., which do not require potable water.

A pair of wastewater paths 104 and 106 extend from water user structure 102. Wastewater path 106 applies blackwater to centrifuge 108. Expedited centrifuge 108 separates solids from blackwater path 106 and extends the separated solids via path 113 to dryer 136. Dryer 136 dries the blackwater solids and applies them to coal 138 where they are mixed with fuel 138 and subsequently burned in coal free steam plant 140. The bacteria in the dried blackwater solids are burned by coal free power plant 140.

Centrifuge 108 has a liquid blackwater output 110 which extends to preheat 116. Preheat 116 receives this liquid blackwater output 110 and extends it to ozonolysis mechanism 122 which uses ozone and the like to kill bacteria in the blackwater liquid waste received from preheat 116. Ozonolysis mechanism 122 applies its output to small distillation unit 126, which applies its distilled output via path 154 to large reservoir 168.

Preheat 114 receives greywater from liquid waste path 104 of water user structure 102. This greywater is applied via preheat 114 to ozonolysis mechanism 120 which applies its output to distillation unit 124. The output of distillation unit 124 is applied via path 152 to small reservoir 166.

Steam from coal free power plant 140 is applied via path 158 to distillation units 124 and 126. Most water in the distillation units 126 and 124 is distilled and returned via path 154 to large reservoir 168 and via path 152 to small reservoir 166. Distillation unit 124 and distillation unit 126 apply condensate 160 to boiler 191 of coal free power plant 140 via path 195 so that it can make more steam that is applied via path 158 to distillation units 124 and 126 to small reservoir 166 and large reservoir 168.

Coal free power plant 140 may be used to generate steam power and ultraviolet light. Embodiments of the invention burn carbon from the various filters as shown on FIG. 1. The carbon in the filters used by the embodiment of FIG. 1 is returned to the coal free steam plant 140 along with the coal and is burned. Activated carbon is extremely effective to remove trace amounts of organics and the like. At the end of their useful life, the carbon filters may be burned by the coal free steam plant as fuel.

Figure 2:
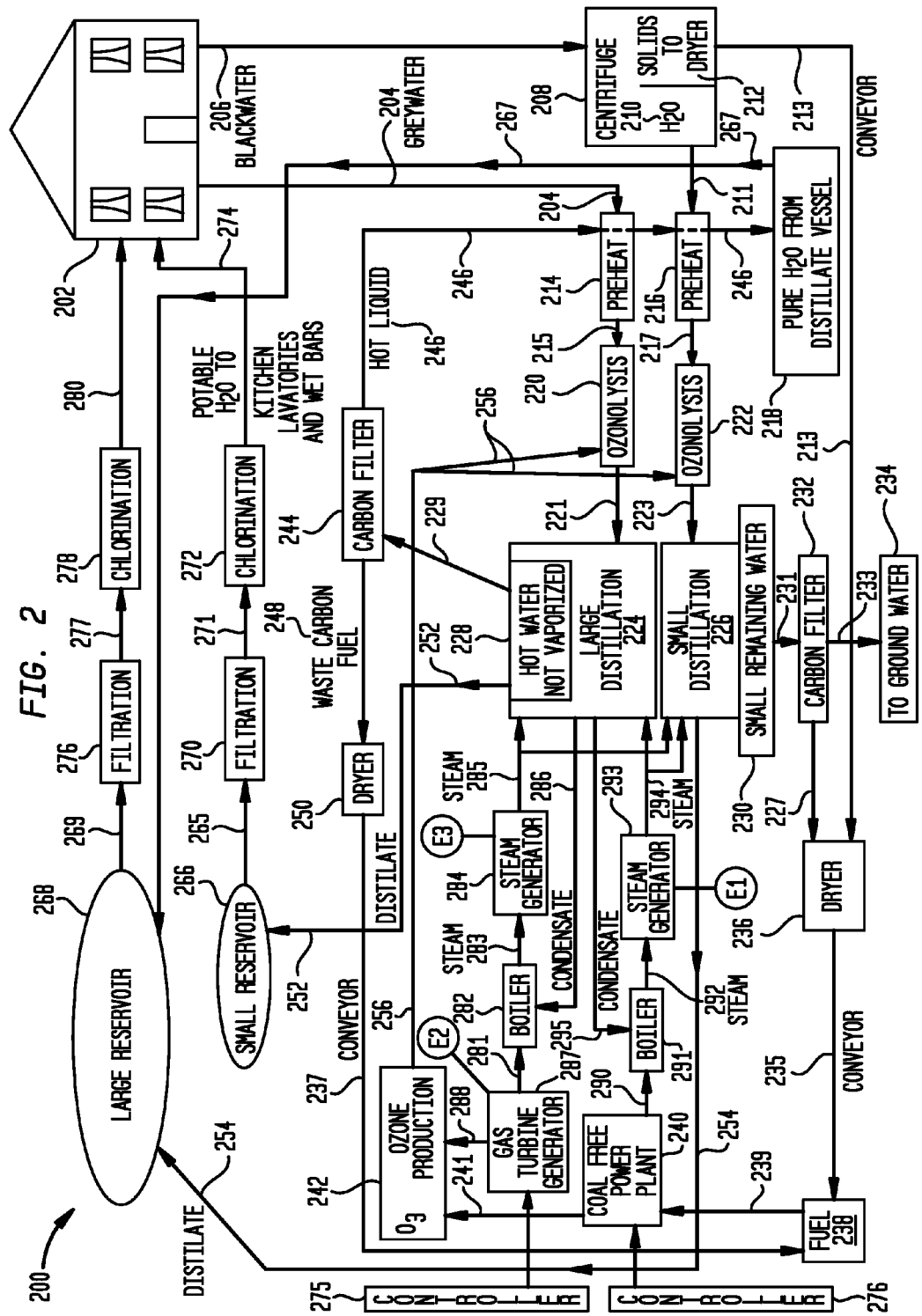
FIG. 2 discloses further details of the embodiment of FIG. 1.

The co-adjuvant gas turbine generator shown together with its associated elements shown on FIG. 1 comprises gas turbine generator 187 which applies its output over paths 181 to boiler 182 which generates steam as shown in greater detail on FIG. 2. The steam is applied over path 183 to steam generator 184 which similarly generates steam as described on FIG. 2. The steam generator 184 applies generated steam over path 185 to element 125 whose elements use the steam as described in greater detail on FIG. 2. The elements shown within wastewater processing element 125 receive the steam from coal free power plant 140 during the low usage night hours when only the coal free steam plant 140 is operating to process wastewater of the system of FIG. 1.

As priorly described, co-adjuvant gas turbine generator 187 is operational together with the coal free steam plant 140 during the daylight hours when the system of FIG. 1 and its customers require increased processing of wastewater.

As priorly described, the apparatus embodying the present invention is adapted to generate electricity which may be used by the system itself or may be generated for sale to others such as utilities. The apparatus that generates this electricity and distributes it for all off-site use to others including utilities and the like comprises generators that that have facilities for coupling the electric output of the generators to interface devices that are operable to apply the electricity from the generators to circuitry that extends to the off-site customer desiring to receive this electricity. This interface device is shown on FIG. 1 by numbered designations such as E1, E2, E3. On FIG. 1 interface E1 is coupled to steam generator 193 of the coal free power plant 140. Interface E2 is coupled to gas turbine generator 187. Interface E3 is coupled to steam generator 184. All of these interfaces extend electricity to the off-site customers. Similarly, these interfaces E1, E2, E3 are shown on FIG. 2 as coupled to steam generator 293, gas turbine generator 287 and steam generator 284 for extending electricity from these devices to off-site customers.

Description of FIG. 2

The embodiment of FIG. 2 includes small reservoir 266, large reservoir 268, and wastewater treatment apparatus similar to that shown on FIG. 1 but is shown in greater detail in FIG. 2. FIG. 2 includes Coal free power plant 240 and associated apparatus as well as co-adjuvant gas turbine generator 287 Numbers in the 100 series on FIG. 1 are shown with a corresponding higher number in the 200 series on FIG. 2. For example, small reservoir 166 on FIG. 1 is designated as element 266 on FIG. 2.

Potable water is applied by path 265 from small reservoir 266 via a series connection of paths 265, filtration 270, chlorination unit 272, and path 274 to water user structure 202. This potable water is extended within water user structure 202 to kitchen sinks, wet bars, or any outlet which supplies potable water suitable for drinking, cooking, etc.

Water from large reservoir 268 is extended via path 269, filtration element 276, chlorination unit 278, and path 280 to water user structure 202. This water is provided within water user structure 202 to showers, garbage disposals, bathrooms, toilets, etc., which do not require potable water.

Path 206 transports blackwater from water user structure 202 to centrifuge 208 operating on an expedited basis. Element 212 of centrifuge 208 extracts the blackwater solids from path 206 and extends the extracted blackwater solids over path 213 to dryer 236. Dryer 236 dries the blackwater solids and applies them to path 235 to coal free fuel supply 238 where they are burned in coal free steam plant 240. The bacteria in the blackwater solids are economically burned by coal free steam plant 240.

Centrifuge 208 has a blackwater liquid wastewater output 210 which is applied via path 211 to preheat 216. Preheat 216 receives this blackwater liquid waste and extends it to ozonolysis mechanism 222 which kills the bacteria received in the blackwater liquid waste from preheat 216. Ozonolysis mechanism 222 receives ozone on path 256 and kills the bacteria and applies its output to small distillation unit 226, which distills water that is applied via path 254 to large reservoir 268.

The liquid input to preheat element 214 is the greywater received from liquid waste via path 204 from water user structure 202. This greywater is applied via preheat 214 to ozonolysis element 220, which receives ozone on path 256 to kill the bacteria and applies its output to large distillation unit 224. The output of large distilation unit 224 is applied via path 252 to small reservoir 266.

Preheater 216 heats the received blackwater liquid waste using hot water in path 246. Path 246 receives the hot water that originated in element 228 within large distillation unit 224. This hot water is not vaporized by the large distillation unit 224 and is received by the hot water unit 228 and applied over paths 229 to carbon filter 244 and, in turn, to path 246 which extends through preheat elements 214 and 216 to distillate vessel 218. Path 246 terminates in distillate vessel 218 which contains pure water generated by large distillation unit 224. Path 246 extends through preheat elements 214 and 216. The greywater and blackwater liquid within preheat elements 214 and 216 is only thermally connected to the hot water within path 246. There is no integration of the hot water in hot water path 246 with blackwater liquid in the preheat elements 214 and 216. The hot water within distillate vessel 218 is extended over path 267 and discharged as potable water into large reservoir 268.

The output of coal free power plant 240 is applied via path 290 to boiler 291 which generates steam that is applied over paths 292 to steam generator 293 which generates further steam that is applied via path 294 to large distilization unit 224 and to small steam distilization unit 226. When co-adjuvant gas turbine steam generator 287 is operating, it applies its output to boiler 282 which applies its output over path 283 to steam generator 284 which generates steam that is applied over path 285 to large distilization unit 224. The co-adjuvant gas turbine steam generator 287 is effective when operated to cause steam generator 284 to apply steam to large distilization unit 224 and small distilization unit 226. Most water in distillation units 224 and 226 is condensed. It can also be treated with ultraviolet light (not shown) before being returned via path 254 from small distilization unit 226 to large reservoir 268 and via path 252 from large distilization unit 224 to small reservoir 266. Distillation units 224 and 226 are steam powered by the steam received over path 294 from coal free plant 240 via steam generator 293. Distilization units 224 and 226 also receive steam generated by gas turbine 287 via boiler 282 and steam generator 284 and path 285 when co-adjuvant gas turbine 287 is in operation.

Greywater in path 204 is preheated by preheat 214. This preheat element provides more time for processing of the received greywater waste by ozonolysis element. 220. Some of this water is distilled by large distillation unit 224. It is advantageous to condense all the steam that is generated by the coal-free power plant 240 and co-adjuvant gas turbine generator 287. It is advantageous to use that energy required to condense this steam without using a cooling tower.

Ozone production element 242 receives electricity from coal-free power plant 240 and from the co-adjuvant gas fired steam turbine generator 287 to make ozone. This ozone extends via path 256 to the inputs of ozonolysis element 220 and 222. The output of ozonolysis element 220 comprises pure oxygen that extends to large distillation unit 224. The output of the ozonolysis mechanism 222 is pure oxygen that extends to small distillation unit 226.

A small amount of water enters groundwater element 234 since there is not enough steam to distill all the water in each of distillation units 224 and 226. This small amount of water is applied through carbon filter 232 as groundwater 234.

Periodically, carbon filter 232 is replaced and applied via dryer 236 to coal 238 for burning in coal free power plant 240.

As priorly described with respect to FIG. 1, the designated interfaces E1, E2, E3 of FIG. 2 operates in the same manner to distribute electricity to off-site customers.

Figure 3:
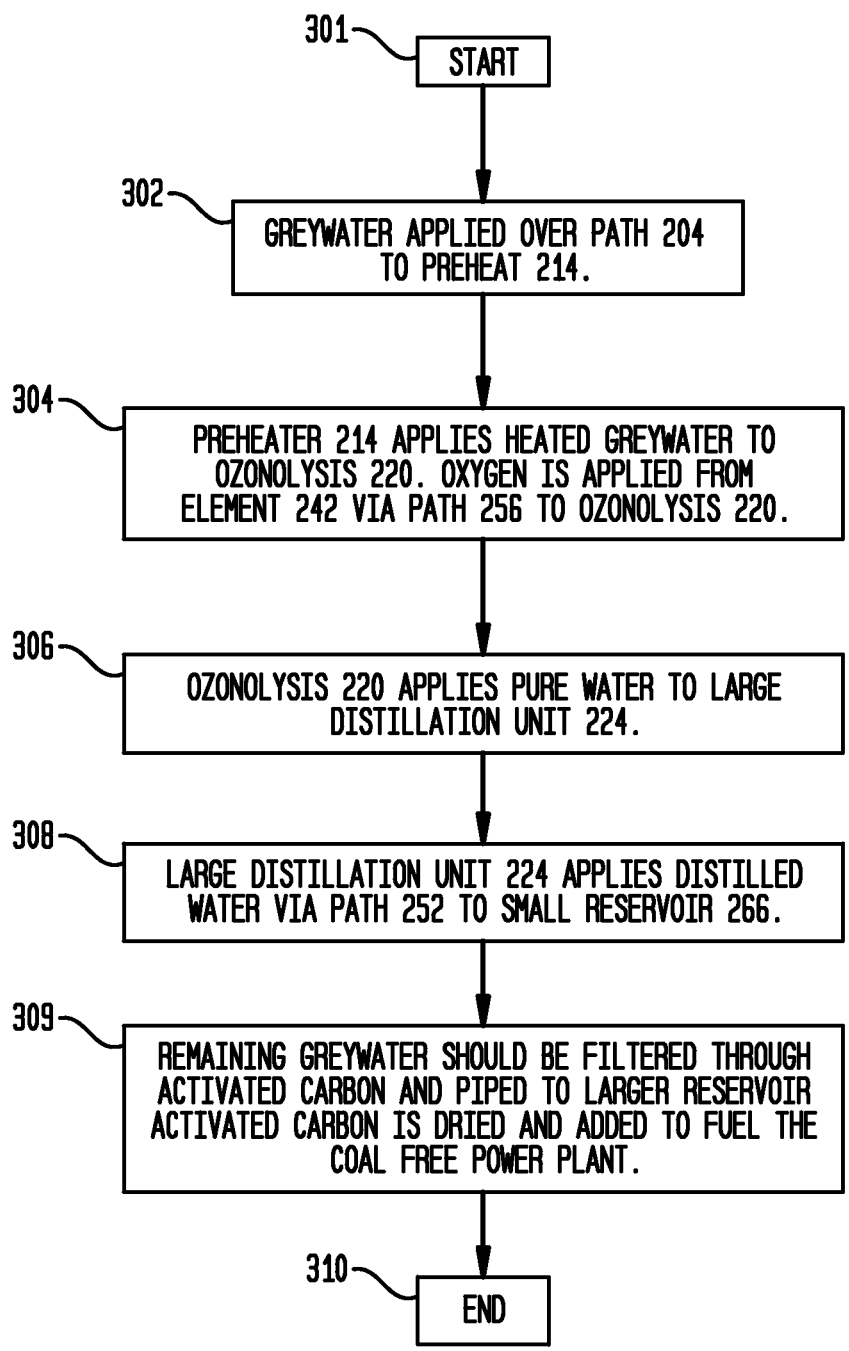
FIG. 3 discloses a flow chart illustrating the method a process step by means of which greywater is economically processed.

Description of FIG. 3

The flowchart of FIG. 3 illustrates method process steps by which apparatus of FIG. 2 processes the greywater. Step 301 is the start of the process. In process step 302, water user structure 202 applies greywater over waste path 204 to preheat 214. Preheat 214 applies heat to the received greywater to facilitate subsequent processing. In process step 304, preheat 214 applies heated greywater to ozonolysis element 220, which receives ozone from element 242. In process step 306, ozonolysis element 220 applies pure water to large distillation unit 224. In process step 308, large distillation unit 224 applies distilled water via path 252 to small reservoir 266. Process step 309 performs a function of age during that he remaining Greywater should be filtered through activated carbon hand piped to large reservoir of activated carbon which is dried and added to fuel the coal free power plant shown as the heating chamber of FIG. 7. Step 310 is the end of the process. Process step 310 is and of the series of processes shown on FIG. 3.

Figure 4:
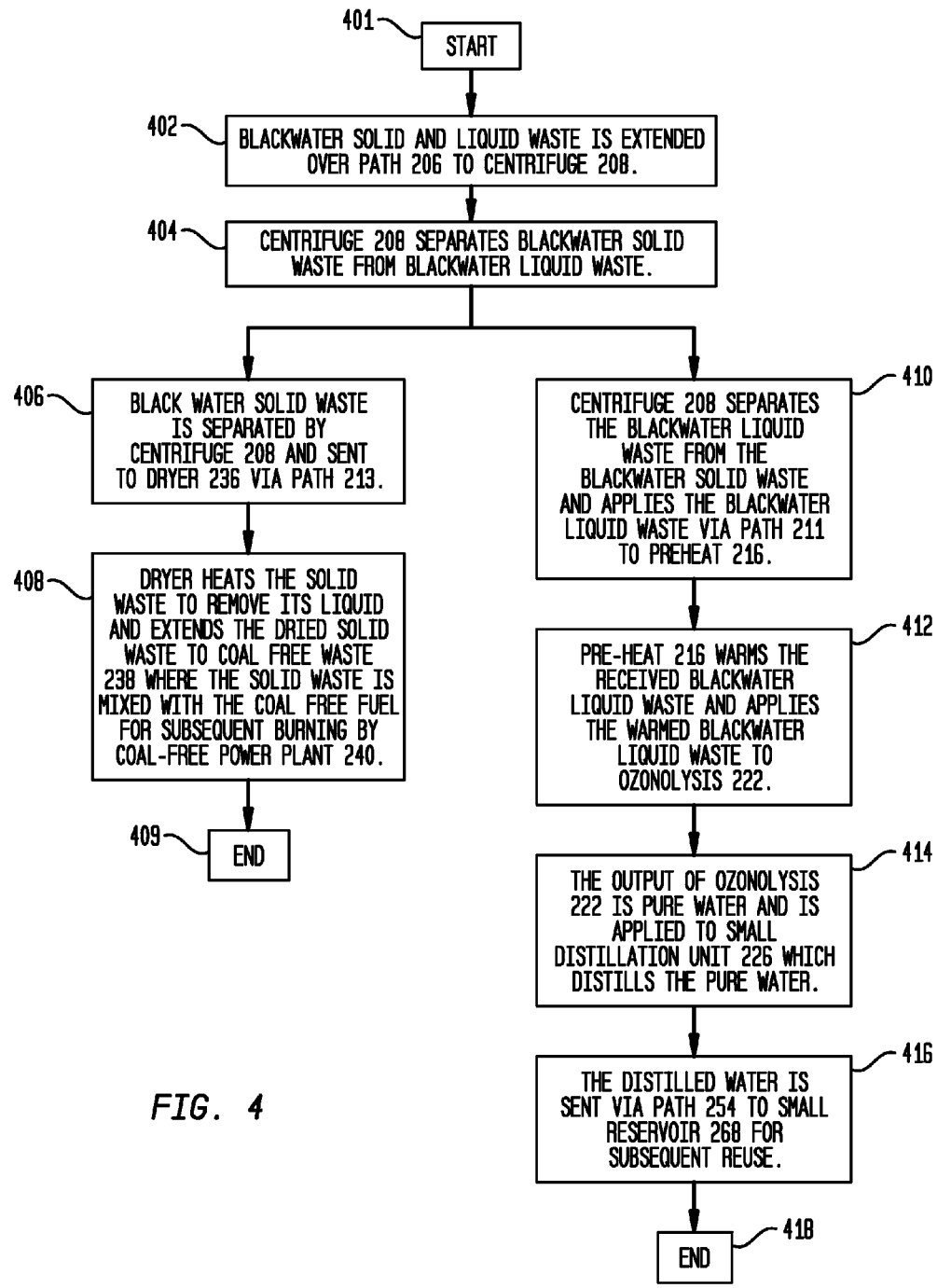
FIG. 4 discloses a flow chart illustrating the method process steps by means of which blackwater are processed.

Description of FIG. 4

Step 401 is the beginning of the process. In process step 402, water user structure 202 generates blackwater that is extended via path 206 to expedited centrifuge 208. In process step 404, expedited centrifuge 208 separates blackwater solid waste from blackwater liquid. In process step 406, blackwater solid is separated by centrifuge 208 and sent via path 213 to dryer 236. In process step 408, dryer 236 heats the solid blackwater waste to remove the liquid and applies the dried solid blackwater waste to coal free fuel 238, where the solid blackwater is mixed with coal free fuel for burning by coal free power plant 240. Step 409 is the end of the process in which solid blackwater is disposed of by burning coal free fuel.

Step 404 begins a process in which blackwater liquid is processed. In process step 410, expedited centrifuge 208 separates blackwater liquid from blackwater solid waste, and extends the blackwater liquid via path 211 to preheat 216. In process step 412, preheat 216 raises the temperature of the blackwater liquid to facilitate its processing. Preheat 216 applies its blackwater liquid to ozonolysis mechanism 222. In process step 414, the output of ozonolysis mechanism 222 is pure water since it receives ozone from element 242 via path 256. This ozone facilitates the operation of ozonolysis mechanism 222 in converting blackwater liquid into water. This water is applied to small distillation unit 226 which distills the water. In process step 416, distilled water is applied via path 254 to large reservoir 268 for subsequent use by water user structures 202. Step 418 is the end of the process which has received the blackwater liquid from expedited from centrifuge 208, processed the blackwater liquid and applied distilled water to large reservoir 268.

Figure 5:
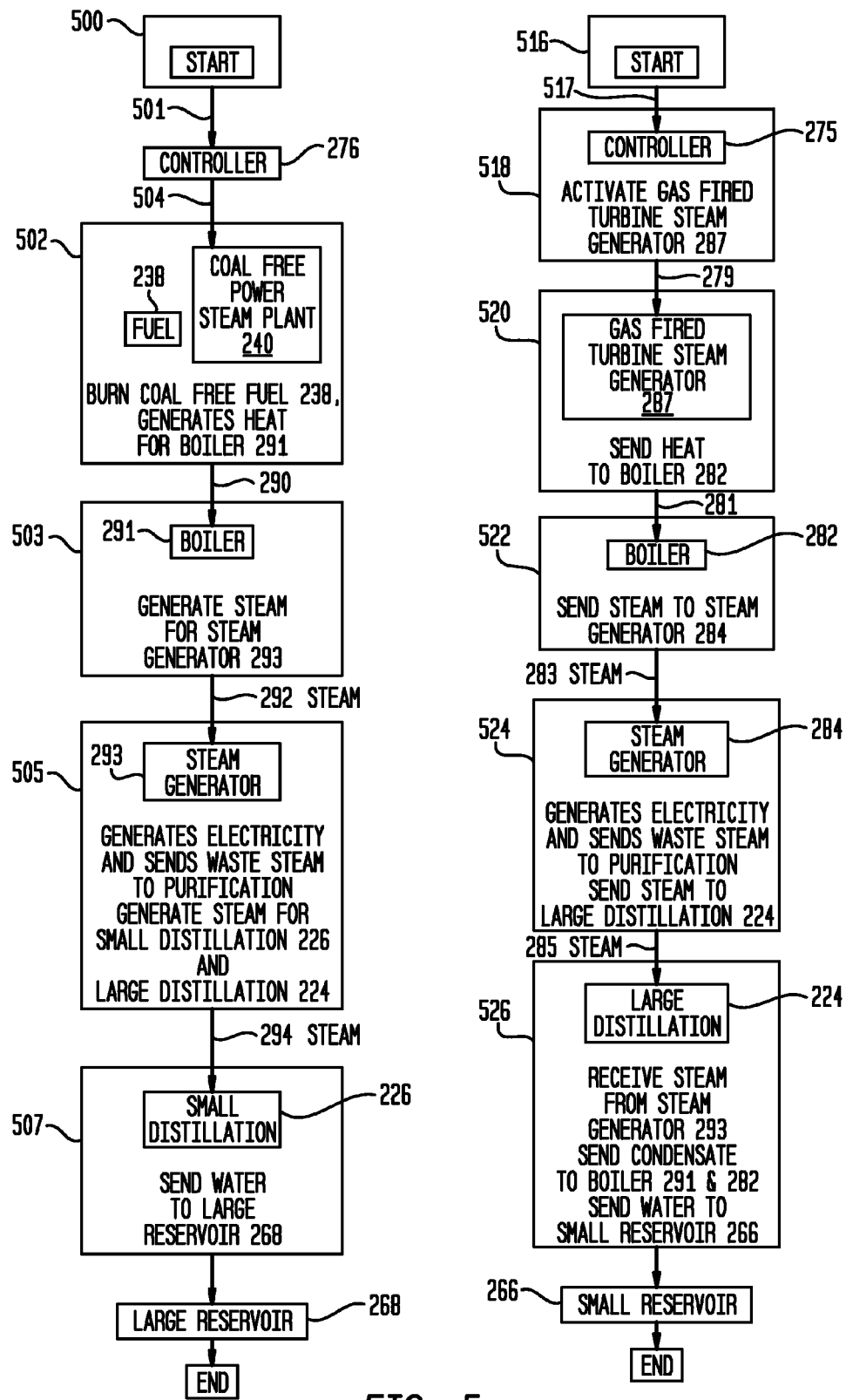
FIG. 5 discloses a flow diagram illustrating the method process steps provided by the coal free power plant to supply steam to the wastewater processing apparatus of FIG. 2.

Description of FIG. 5

Figure 6:
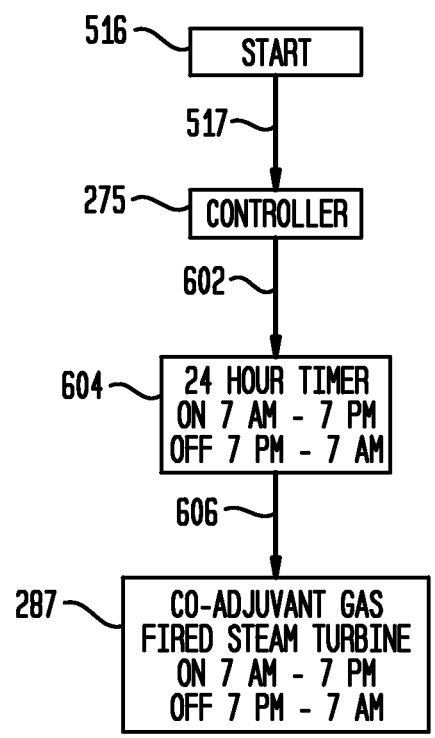
FIG. 6 discloses a flow diagram illustrating a process whereby a controller of the co-adjuvant gas turbine generator determines the time of day at which the co-adjuvant gas turbine generator is activated. This controller is also effective to determine the time of day at which the co-adjuvant gas turbine generator is deactivated when the need for its supplemental steam is not required.

FIG. 2 taken in conjunction with flow charts of FIGS. 3, 4, and Flow Diagrams of FIGS. 5 and 6 illustrate the process steps by which the apparatus of FIG. 2 processes the wastewater received via centrifuge 208 from a water user structure such as 202.

The left-column of FIG. 5 illustrates the process steps for the operation of coal free power plant 240. The right column of FIG. 5 illustrates the process steps for the operation of co-adjuvant gas fired turbine generator 287. These steam power plants together generate the steam required to process the received wastewater discharged by a water user structure 202 and transmitted to centrifuge 208.

The process steps for coal free power plant 240 begin with process step 500 of FIG. 5 which transmits start signals via path 501 and start element to controller 276. Controller 276 transmits signals via conductor 504 to coal free power plant 240 in process step 502. Process step 502 causes coal free power plant 240 to operate at a continuous rate and at a specified steam output. Also, in process step 502, coal free power plant 240 burns coal free fuel 238 and applies heat over path 290 to boiler 291 of process step 503. In process step 503, boiler 291 converts its input to steam which is applied to steam generator 293 in process step 505. Steam generator 293 functions as a steam turbine in process step 505 to apply steam via path 294 to small distilization unit 226 of process step 507. The steam received by small distilization unit 226 is also applied to large reservoir 268 as END signal.

The steam of process step 505 is also applied to large distilization unit 224 of the right column, process step 526. In process step 526, the output of large distilization 224 is applied is applied via small reservoir 268 to END signal of the right column of FIG. 5.

Coal free power plant 240 of FIG. 5 which has been replaced by the heat chamber of FIG. 7, but if generates steam power during the daytime when wastewater processing needs are greater. The co-adjuvant gas turbine generator 287 is activated at 7 AM to generate supplemenatal steam needed by the wastewater processing system of FIG. 2. This supplemental steam is generated by the process steps of the elements in the right column of FIG. 5.

The process steps for the operation of co-adjuvant gas turbine generator 287 begin with process step 516 and start element at the top of the right column of FIG. 5. Start element 516 activates the process step 516 by sending a signal over path 517 to controller 275 in process step 518. Controller 275 receives signal 517 and generates signal 279 to activate co-adjuvant gas turbine generator 287 and generate supplemental steam in process step 520.

In process step 520, co-adjuvant gas turbine generator 287 generates heat and extends it over path 281 to boiler 282.

As shown on FIG. 2, boiler 282 receives water from large distilization element 224. Water used by boiler 282 in process step 522 is converted to steam by the heat received from co-adjuvant gas turbine generator 287. Water is converted to steam by boiler 282 in process step 522 that is extended over path 283 to steam generator 284 in process step 524. Steam generator 284 functions as a gas turbine generator which generates further steam in process step 524.

This generated steam of process step 524 is applied to large distilization element 224. This also applies water to boiler 291 of the coal free power plant 240 to produce steam. As priorly mentioned, large distilization unit 224 also receives steam from steam generator 293 of coal free power plant 240. In process step 526, large distilization unit 224 also extends distilled water as shown on FIG. 2 to small reservoir 266. END step 266 ends the processing step for the co-adjuvant gas turbine generator 287 on FIG. 5.

Those skilled in the technology to which the present invention pertains will appreciate that the disclosed wastewater processing system of FIG. 2 embodies complex apparatus that must be maintained to accommodate various system parameters such as: waste material weight, time of day, temperature of various elements, and pressure of various elements in order for the equipment to operate satisfactorily. Monitoring the system parameters is achieved by controller 275 which embodies a computer and software that monitors the system of FIG. 2 and its parameters.

Description of FIG. 6

FIG. 6 is a flow diagram illustrating processing of the TIME parameter by the present invention. This TIME parameter specifies how and when the co-adjuvant gas generator 287 is operated to generate supplemental steam. Coal free power plant 240 of FIG. 2 runs continuously 24/7 to generate a low-level of steam. This low-level of steam is adequate to operate the system during evening hours (7 PM-7 AM) when the demand for processing wastewater is relatively low. Coal free power plant 240 runs at the same low level during the day (7 AM-7 PM) when the demand for treating wastewater is higher. Since the coal free power plant 240 runs continuously; its steam output is adequate during evening hours to support wastewater processing; but it is not adequate during daylight hours when the demand for wastewater processing is high. The coal free power plant 240 then requires supplemental steam from the co-adjuvant gas turbine generator 287 to support adequate system operation.

Let it be assumed that the evening hours of operation are 7 p.m. through 7 a.m. and that daylight hours of operation are 7 a.m. to 7 p.m. The steam output from the coal free power plant 240 is adequate during the evening hours; and the assistance of supplemental steam from the co-adjuvant turbine generator 287 is not then required. Adequate system operation during this time requires availability of the output of the coal free power plant 240 together with the supplemental steam from the co-adjuvant gas turbine generator 287.

FIG. 6 illustrates the following apparatus embodying the invention including: start element 516, path 517, path 602, and controller 275 are shown on both FIGS. 5 and 6; path 602, path 606, and 24 hour timer 604 are shown on FIG. 6; and the co-adjuvant gas turbine generator co-adjuvant gas turbine generator 287 is designated as being active during the daylight hours of 7 AM through 7 PM, and is designated as being off during the evening hours of 7 PM through 7 AM. Elements 75 is a controller. Timer 604 is programmable to specify the same daylight hours and evening hours for co adjuvant gas turbine generator 287. These hours are for illustrative purposes only.

This process begins when the system operator activates start key 516. Start key 516 is shown in greater detail in the right column of FIG. 5. The activation of start key 516 extends a signal from start key 516, over path 517 to controller 275 which may comprise a computer and/or appropriate software. The operator may operate the system of FIG. 6.

The system operator may initiate automatic operation by operating controller 275 to apply a control signal over path 602 to timer 604. Timer 604 generates signal 606 to initiate automatic operation of the co-adjuvant gas fired turbine generator 287 to begin successive operational periods beginning when an initial signal is first applied to path 606 by timer 605. Timer 605, after first applying signal to path 606, causes the co-adjuvant gas-fired turbine generator 287 to begin operations as determined by the operator and controller 275.

The above operations are merely illustrative since controller 275 is a computer-controlled software device and may be programmed to operate as specified by the system operator and controller 275 of FIG. 6 to apply a control signal over path 602 to timer 604. Timer 604 generates signal 606 to initiate automatic operation of the co-adjacent gas turbine generator 287 to begin successive operational periods beginning when an initial signal is first applied to path 606 by timer 604 signal to path 606, because after applying signal path 606 to causes would gas-fired turbine generator 287 to begin operations as determined by the operator and controller 275.

Controller 275 and co-adjuvant gas turbine generator 287 are adapted to monitor the wastewater processing system to determine whether the system that is operating as specified by the TIME parameter. Other parameters may also be monitored by controller 275 and appropriate software. This system can also monitor other system parameters including for example; wastewater temperature and weight; steam temperature; oxygen level, ozone production, carbon filter blockage, etc. The monitoring of the system and its parameters facilitates improved service of the system to its users and customers.

Description of FIG. 7

FIG. 7 discloses an element entitled "Forced Air Gas Fired Fluidized Bubbling Bed Combustion Chamber". The structure of FIG. 7 comprises chamber 710 and its associated elements. These elements comprise a heat generator for a coal-free power plant 148 and 240 shown on FIGS. 1 and 2 respectfully. The main element on FIG. 7 is chamber 710 and its associated elements.

Input tube 708 is adapted to be connected to a source of flammable gas such as propane or natural gas or the like.

Input tube 708 curves upward at the bottom of chamber 710 where it is connected to a circular porous element bubbling bed 704. The fire bed is adapted to support solid wastes woodchips or any other consumable elements 706 which are adapted to be ignited, burned, and consumed to generate heat within chamber 710.

Chamber 710 may be filled with used carbon filters along with other solids from facilities to serve as a source of fuel to generate usable hot air within chamber 710. This hot air proceeds upwardly from the burning fire and proceeds to hot air tube 190 from chamber 710 away from chamber 710 to boiler 191. Boiler 191 receives condensate from distillation 124, which is converted to steam by boiler 191 and extended to steam generator 193. Steam generator 193 discharges waste steam which is applied over path 191 to distilization element which is also shown on FIG. 1 and performs the useful function of generating water for storage in small reservoir 166 and larger reservoir 168 as shown on FIG. 1 and comparable elements in the 200 series on FIG. 2.

In summary, the chamber 710 and associated elements as shown on FIG. 7 provide a useful method of consuming waste and generating steam without burning coal.

EPILOGUE

The scope of the invention shall be broadly construed as permitted by any reasonable interpretation disclosed and claimed herein. The invention is described with reference to the use of multiple bodies of water referred to as a "large reservoir and a small reservoir". Those of ordinary skill will readily appreciate that the manner in which the invention is practiced is not dependent upon the size of the bodies of water. The use of the term "small and large body of water, rather than the use of" a first and a second body of water, facilitates ease of understanding.

The invention does not require multiple bodies of water of which one is large and other of which is small. As long as sufficient size and water volume exists, it does not matter whether one body is large and the other body is small, or whether both are equal. Also, the applicant's invention could be practiced if sufficient large bodies of water are available.

Also, the bodies of water do not have to be outdoor reservoirs. The bodies of water could be storage tanks which, when properly configured, could serve the same water storage function. The same comments may be made with regard to the structure to which water is delivered. This document refers to structures that use water as "water user structures". Each water user structure could be a home or a plurality of homes, or one or more buildings, or apartments in a housing complex, or could be one or more garages, industrial structures, or any mixture of industrial, commercial or residential structures having a use for water.

The invention is described herein with regard to the use of any power plant and associated co-adjuvant gas turbine. The purification process uses activated carbon filters which shall be burned as fuel at the end of their usefulness.

It should be understood that applicant's invention may be practiced with at least a single body of water when greywater is processed as described. Blackwater liquid is processed in the same manner as described. The blackwater solids are disposed of as described, or could be distributed to farmers or agricultural uses.

In view of the above, the scope of applicant's invention shall be as limited to and defined by applicant's disclosure taken in conjunction with his claims.

What I claim is:

1. A method comprising:
   receiving wastewater from a user;
   processing the wastewater to remove solid waste;
   applying natural gas to a lower input of a chamber;
   supplying the solid waste onto a top surface of a forced air bubbling bed structure within the chamber;
   burning the natural gas and the solid waste on the top surface of the bubbling bed structure to form hot air at an upper exit of a top of the chamber;
   receiving the hot air at a boiler from the upper exit of the chamber;
   forming steam from a condensate utilizing the hot air at the boiler;
   applying the steam from the boiler to operate a steam turbine generator;
   providing electricity generated from the steam turbine generator to the user;
   providing waste steam from operating the steam turbine generator to a wastewater treatment apparatus;
   distilling the wastewater to form a distilled water at the wastewater treatment apparatus using the waste steam wherein distilling the wastewater condenses the waste steam to form the condensate;
   returning the condensate from the wastewater treatment apparatus to the boiler for re-use in forming the steam for the steam turbine generator; and
   returning the distilled water for re-use by the user.

2. The method of claim 1 further comprising:
   operating a co-adjuvant gas turbine generator intermittently to apply supplemental steam to the wastewater treatment apparatus in addition to steam provided to the wastewater treatment apparatus by the steam turbine generator; and
   providing electricity from the steam turbine generator to users not served by the water treatment apparatus.

3. The method of claim 2 wherein the wastewater comprises blackwater and the method further comprises:
   receiving greywater;
   distilling the greywater at the wastewater treatment apparatus to form a distilled potable water; and
   returning the distilled water for re-use by the user via a second reservoir;
   and
   returning the distilled potable water via a first reservoir for re-use by the user.

4. The method of claim 2 wherein the wastewater comprises liquid blackwater and the method further comprises:
   receiving liquid greywater for treatment.

5. The method of claim 4 further comprising:
   preheating liquid blackwater in a first preheater and then treating the preheated blackwater with ozone prior to the distillation to produce the distilled water;
   preheating liquid greywater in a second preheater, then treating the preheated greywater with ozone, and then distilling the ozone treated greywater to produce a potable distilled water; and
   returning the distilled potable water to a first reservoir for re-use by the user.

6. The method of claim 5 further comprising:
   returning spent steam from a distillation apparatus as condensate to the co-adjuvant gas turbine generator.

7. The method of claim 6 further comprising:
   applying hot water from the distillation apparatus via a path including the first and second preheaters to a vessel, wherein the hot water heats the preheaters, wherein the hot water is thermally connected to the preheaters while not being comingled with liquid in the preheaters; and
   discharging hot water stored in the vessel to a second reservoir.

* * * * *